United States Patent [19]
Braun

[11] Patent Number: 6,111,860
[45] Date of Patent: Aug. 29, 2000

[54] COMMUNICATION INTERFACE SYSTEM FOR HALF DUPLEX DIGITAL RADIOS

[75] Inventor: Charles H. Braun, Carmel, N.Y.

[73] Assignee: ITT Manufacturing Enterprises, Inc., Wilmington, Del.

[21] Appl. No.: 08/963,169

[22] Filed: Nov. 3, 1997

[51] Int. Cl.$^7$ ............................ H04L 5/14; H04L 5/16
[52] U.S. Cl. ............................ 370/276; 370/296
[58] Field of Search .................. 370/276, 277, 370/278, 296, 465, 466, 467, 469, 470, 493, 495; 375/220, 222

[56] References Cited

U.S. PATENT DOCUMENTS

| | | | |
|---|---|---|---|
| 4,082,919 | 4/1978 | Day et al. .................................. | 179/2 |
| 5,124,976 | 6/1992 | Lemaistre et al. ....................... | 370/29 |
| 5,224,108 | 6/1993 | McDysan et al. ..................... | 370/110.1 |
| 5,264,958 | 11/1993 | Johnson ................................ | 395/325 |
| 5,432,786 | 7/1995 | Kawada ................................ | 370/69.1 |
| 5,499,243 | 3/1996 | Hall ..................................... | 370/85.8 |
| 5,734,643 | 3/1998 | Rondeau ................................. | 370/279 |
| 5,737,364 | 4/1998 | Cohen et al. ........................... | 375/220 |
| 5,793,843 | 8/1998 | Morris ..................................... | 379/59 |
| 5,909,464 | 6/1999 | Cohen et al. ........................... | 375/220 |

Primary Examiner—Ajit Patel
Assistant Examiner—Brian Nguyen
Attorney, Agent, or Firm—Saul Elbaum

[57] ABSTRACT

There is disclosed a voice/data protocol for use with half duplex digital radios. The protocol modifies the X.21 HDLC protocol which is widely employed in the transmission of data for digital radios. The X.21 protocol utilizes a control "C" and an indicate "I" signal. In the steady state in conventional systems, both the C and the I leads are "off". When either a DTE or DCE requires service, the units set their C lead to the "on" condition. The opposite end detects the request for service on the I lead and when communications occur, sets the C lead to the "on" condition. When both the DTE and DCE have send and detected "on" conditions on their C and I leads the circuit transfers to the data transfer state and is ready to proceed to data synchronization. In the present protocol, the C signal is defined as a push-to-talk transmit request to the radio. The I signal is defined as a radio busy. When the I signal is asserted by the radio, the radio is busy transmitting voice, receiving voice or receiving data. Under all cases, when the I signal is asserted, any transmit data function being requested or in progress is terminated. The HDLC data stream is evaluated in conjunction with the new C and I signals to provide data/voice discrimination and a data start/end synchronization.

11 Claims, 8 Drawing Sheets

ELECTRICAL INTERFACE CHARACTERISTICS
(AT RECEIVER)

DATA CIRCUITS

| SIGNAL NAME | 1 | | 0 | |
|---|---|---|---|---|
| | MAX | MIN | MAX | MIN |
| -T | -6.0 VOLTS | -0.3 VOLTS | +6.0 VOLTS | +0.3 VOLTS |
| +T | +6.0 VOLTS | +0.3 VOLTS | -6.0 VOLTS | -0.3 VOLTS |
| -R | -6.0 VOLTS | -0.3 VOLTS | +6.0 VOLTS | +0.3 VOLTS |
| +R | +6.0 VOLTS | +0.3 VOLTS | -6.0 VOLTS | -0.3 VOLTS |

CONTROL AND TIMING CIRCUITS

| SIGNAL NAME | OFF | | ON | |
|---|---|---|---|---|
| | MAX | MIN | MAX | MIN |
| C | -6.0 VOLTS | -0.3 VOLTS | +6.0 VOLTS | +0.3 VOLTS |
| I | -6.0 VOLTS | -0.3 VOLTS | +6.0 VOLTS | +0.3 VOLTS |
| -S | -6.0 VOLTS | -0.3 VOLTS | +6.0 VOLTS | +0.3 VOLTS |
| +S | +6.0 VOLTS | +0.3 VOLTS | -6.0 VOLTS | -0.3 VOLTS |

COMMUNICATION INTERFACE SYSTEM FOR HALF DUPLEX DIGITAL RADIOS

FIELD OF THE INVENTION

This invention relates to digital radio systems and more particularly to a protocol or communications interface to enable high-speed digital radio operation.

BACKGROUND OF THE INVENTION

Since the early 1970's, microwave radio has been gaining importance as a transmission medium for digital communications. The telecommunication administrations of most countries have digitized transmission and switching facilities and have developed integrated digital networks. The present transmission network consists of a mix of many different communication channels such as fiber optic, cable, coaxial, satellite, line-of-sight radio systems and so on. Digital radios have achieved extreme success due to the fact that their spectral efficiencies are compatible with those of their analog counterparts and they allow coexistence with other transmission systems which do not lead to overall performance degradations. To assure that these criteria are adapted uniformly on a world-wide basis, regulatory bodies such as the CCIR, CCITT, and FCC have approved and provided a number of reports and recommendations which enable consistent transmission and reception and enable various manufacturers to provide communication receivers and transmitters which are totally compatible with one another. The reports and other recommendations from such agencies are widely known and are widely utilized today. In general for the operation of digital radios, reference is made to a text entitled *Microwave Digital Radio,* edited by Larry J. Greenstein and Mansoor Shafi and published by the IEEE, New York, 1988.

It is accurate to say that various protocols for the transmission and receiving in digital radios have been promulgated by the above-noted agencies. An extremely popular protocol which is widely known, is designated as the X.21 protocol. The X.21 protocol provides full duplex communications across point-to-point circuits such as lead circuits using the Higher Data Level Communication (HDLC) protocol. This protocol uses the control (C) and indicate (I) leads as circuit interface signals to indicate the on/off state of directly connected Data Communication Equipment (DCE) and Data Terminal Equipment (DTE).

The Higher Data Level Communication (HDLC) protocol has been is use for many years as a serial communication protocol. The protocol provides full duplex link level communications between data terminal equipment interconnected by wire lines or circuit switched networks.

The protocol uses a continuous synchronous data stream consisting of abort, flag, and zero inserted information characters. When the communication line is not transmitting information characters it is transmitting flag characters. Zero inserted information characters are concatenated together to form data frames. Data frames are bounded by opening and closing flag characters.

The characteristics of the X.21 HDLC protocol signals are very well known. The X.21 HDLC requires that the circuit be connected end to end, both C and I lead asserted and a continuous exchange of flags before advancing from the ready state to the data transfer state. Once in the data transfer state, either end may transmit data simultaneously.

The X.21 and HDLC protocols do not provide the ability to interface with half duplex radios. A half duplex radio, as one can ascertain, is a device that can only transmit in one mode and receive in another mode. The half duplex radio can not transmit and receive simultaneously. As indicated, there is no mechanism defined in the X.21 protocol to indicate push-to-talk transmit action with the radio and there is no mechanism to determine when the radio is busy receiving. The current X.21 and HDLC protocols are defined as data only protocols. The X.21 and HDLC protocols do not support mixed voice and data operation across half duplex radios. The X.21 and HDLC protocols do not provide mechanisms to share a communication media between human voice user and a data terminal. The X.21 and HDLC protocols do not allocate radio resources to voice or data use because there is no capability provided within the protocol to determine when the communications media is being used for voice communications.

It is therefore an object of the present invention to modify the X.21 and HDLC protocols so they are adaptable to operation with half duplex radios.

It is an further object to modify the above-noted protocols so they are compatible with operation with half duplex radios while maintaining the ability of full duplex radios to operate with the protocol in a totally unimpeded manner.

SUMMARY OF THE INVENTION

The present invention is a method for modifying the X.21 (HDLC) protocol to enable interface with half duplex radios to enable said radios to receive both digital and voice data from full duplex communications circuits using the X.21 protocol in conjunction with the Higher Data Level Communications (HDLC). The X.21 protocol conventionally employs circuit interface signals to indicate the on/off state of directly connected Data Communication Equipments (DCE) and Data Terminal Equipments (DTE) by means of a Control signal (C) and an Indicate signal (I) contained in said protocol and used for digital data transmission, said method comprising the steps of: (1) employing the C signal by the half duplex radio as a push-to-talk transmit signal during a voice transmission and (2) employing the I signal by the radio a a busy signal indicative of the transmission of the radio of voice, receiving voice or receiving data.

BRIEF DESCRIPTION OF THE DRAWINGS

FIG. 3 is a state diagram depicting Radio Packet Mode Operation and depicting the various states that the radio of this invention is capable of operating in.

DETAILED DESCRIPTION OF THE INVENTION

Figure 1:
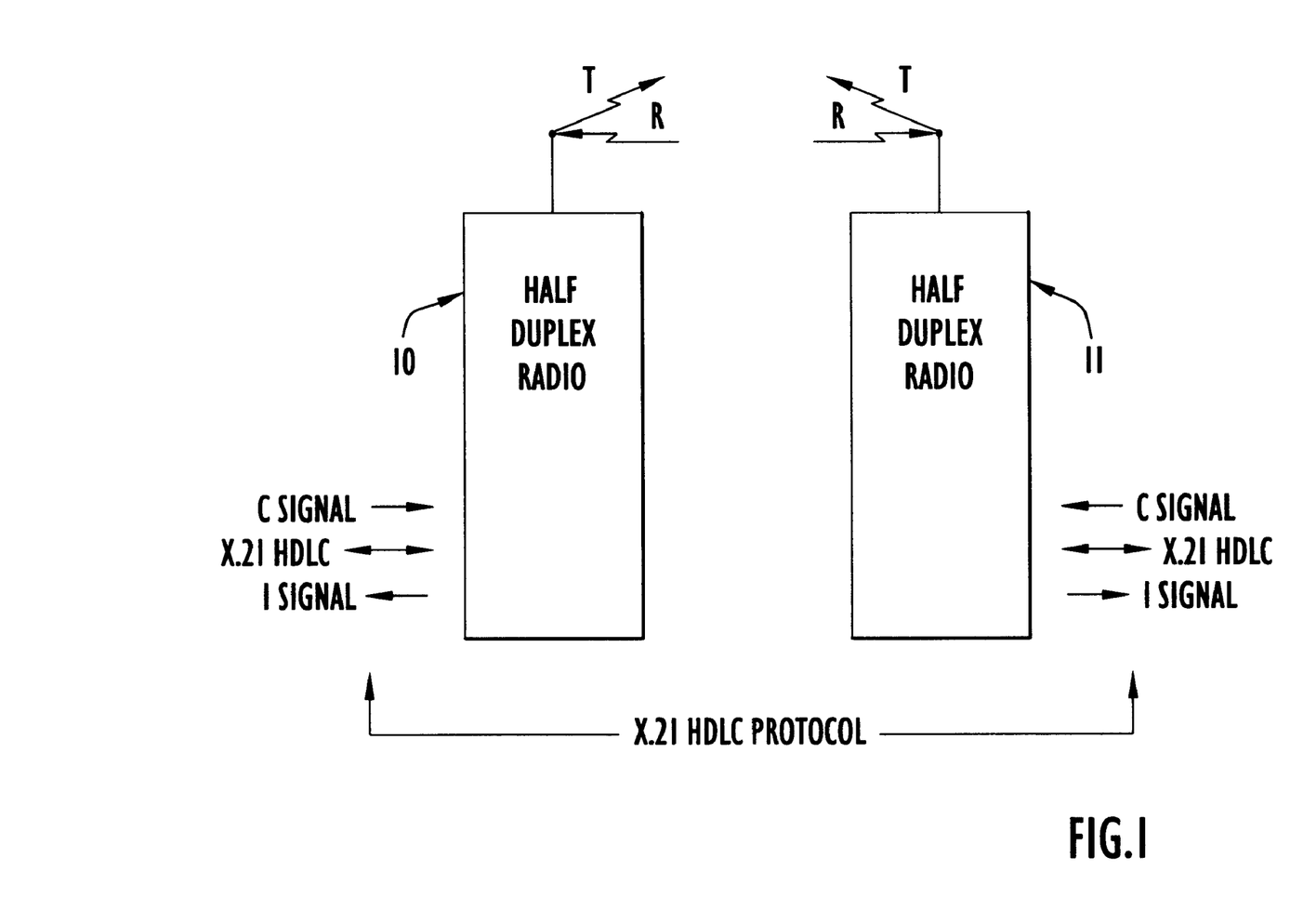
FIG. 1 is a simple block diagram showing communications between two half duplex radios. One radio can be a Data Communications Equipment (DCE) and the other may be a Data Terminal Equipment (DTE).

Referring to FIG. 1 there is shown a simple block diagram of two half duplex digital radios 10 and 11. Also indicated in FIG. 1 is that both radios employ the X.21 HDLC protocol. This protocol as indicated above is a widely used protocol. Both half duplex radios 10 and 11 are capable of transmitting digital data information and are capable of receiving digital data information. The radios 10 and 11 can not transmit and receive simultaneously and that is the definition of a half duplex radio. The X.21 and HDLC protocols are defined based on the above-noted institutions as data-only protocols. They do not support mixed voice data operation across half duplex radios. Thus, the radios 10 and 11 could not normally communicate based on the X.21 and HDLC protocols as they do not provide mechanisms to share the communication media between human voice user and a data terminal. The X.21 and HDLC protocol do not allocate radio resources to voice or data use because there is no capability provided within the protocol to determine when the communications media is being used for voice communications. As will be explained, the present invention overcomes the above-noted difficulties by redefining the use of the X.21 control (C) and indicate (I) signals. These signals are shown in FIG. 1 as (I) and (C). These signals are integrated with the HDLC protocol data stream to form a mixed voice/data protocol for use with radios and particularly adapted for half duplex radios such as radios 10 and 11. The I signal in the new modified protocol is defined as a radio busy signal. When the I signal is asserted by the radio, the radio is busy transmitting voice, receiving voice or receiving data. Under all cases, when the I signal is asserted, any transmit data function being requested or in progress is terminated. The HDLC data stream is evaluated by radios 10 and 11 in conjunction with the C and I signals to provide data/voice discrimination and data start/end synchronization. HDLC flags are used to synchronize the data exchanges between the terminal device and the radio. For example, the received information may emanate from a data terminal device such as the DTE. When voice is exchanged between the user and the radio, HDLC flags are not inserted in the transmission path. This allows a data device to determine the type of activity that is occurring on the radio. By determining in real time the type of activity occurring on the radio, the data terminal can interlace its data between voice transmissions and receptions. This enables a data device to transmit data to the half duplex radios and enables a half duplex radio to communicate via voice procedures.

Modem communication systems such as those utilized in industry or for the military require a communications interface that supports both digital voice and packet data communication over net radio half duplex and point-to-point fall duplex communication facilities. The CCITT X.21 point-to-point leased line service has been widely utilized and as will be explained, is modified to provide the link level communication service required and namely to include half duplex radio receivers.

The modified CCITT X.21 interface specifications, including signaling and timing for interface Data Terminal Equipment (DTE) with Data Communications Equipment (DCE) will be explained. In most communication systems there are four modes of operation desired.

MODE 1

A packet mode half duplex synchronous modified CCITT X.21 data interface between a DCE HF or VHF radio and a DTE User Data Terminal (UDT), a DTE Internet Point (Basic Internet Control Card (BICC)), or a DTE Communication Interface System (CIS) Gateway.

MODE 2

A full duplex synchronous CCITT X.21 data interface between a DCE (non-radio) device and a DTE device.

MODE 3

A half duplex non-synchronous (interrupted signal timing) digital Continuously Variable Slope Delta (CVSD) modulated voice interface between a DCE VHF radio and a DTE external access Basic Internet Control Card (BICC).

MODE 4

A full duplex synchronous digital CVSD voice conditioned di-phase interface between a DCE (non-radio) device and a DTE device.

Figure 3:
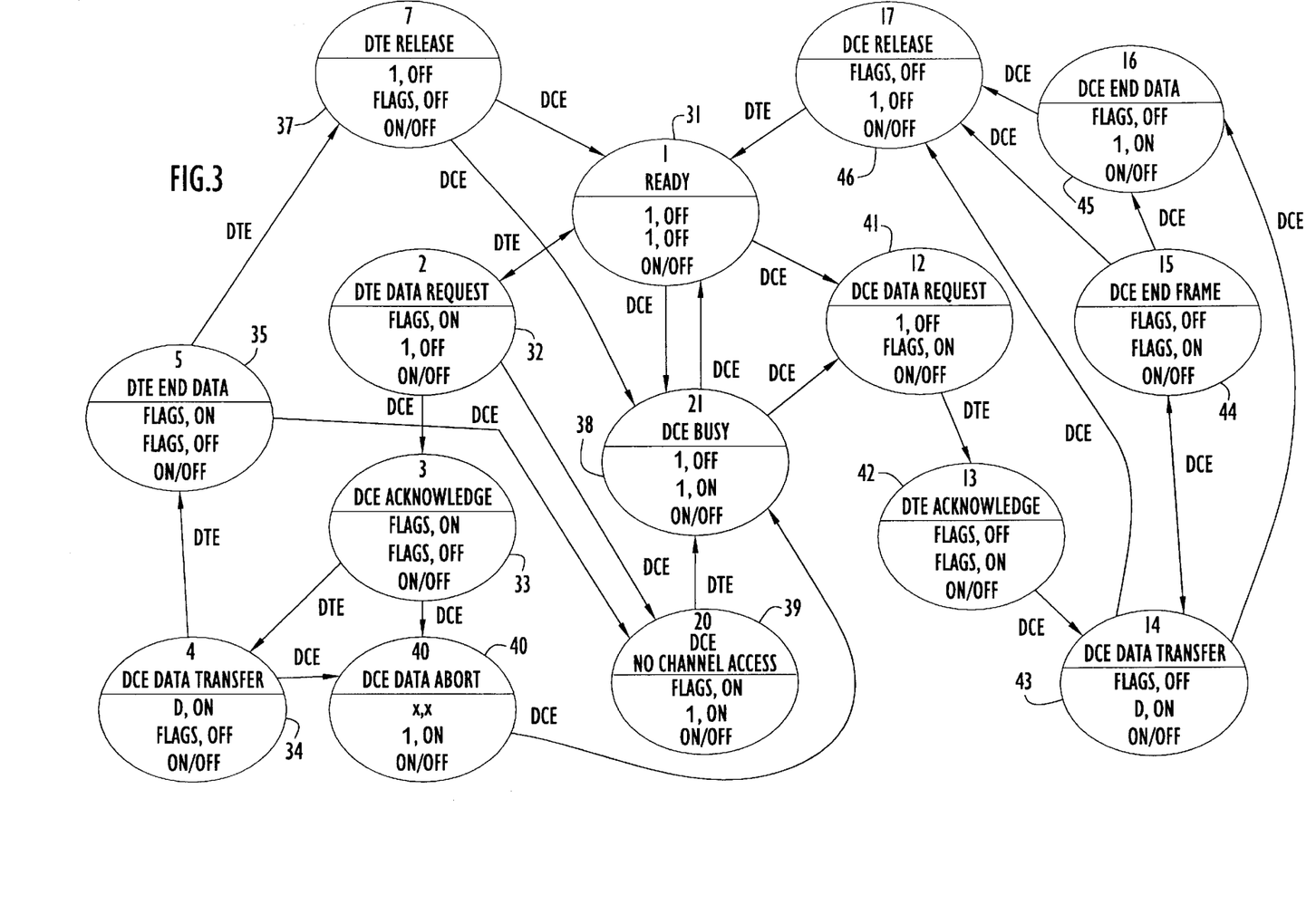

In order to explain the operation of the protocol, reference will be made to a state diagram which is depicted in FIG. 3 which shows the VHF/HF radio packet mode state diagram. One will understand how the system operates when reference is made to the state diagram in conjunction with the enclosed description.

Figure 2:
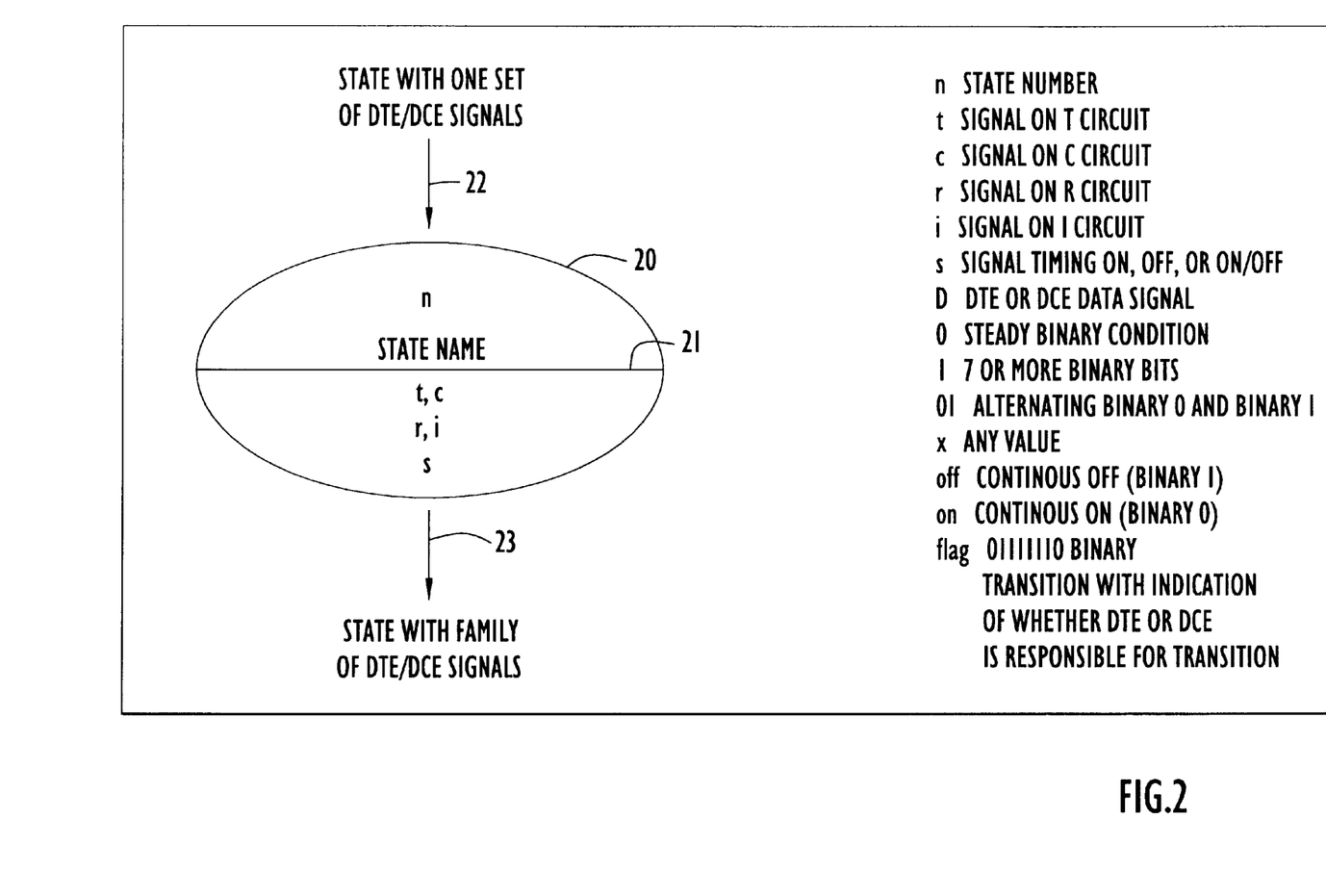
FIG. 2 is a diagram explaining the definition of signals and terms utilized in the state diagrams to follow.

Referring to FIG. 2 there is shown a definition of signals used in a state diagram. On the left hand of FIG. 2, there is shown a oval which is split in half by a centerline 21. The oval 20 contains letters within the upper and lower half, for example n represents a state number, beneath the letter n is the state name. Referring to FIG. 2, beneath the line 21, are the letters t, c, r, i and s. Those letters are defined at the column to the right, for example r is the signal on R circuit, i is the signal on I circuit. The upper arrow 22 indicates State with one set of DTE/DCE signals and the bottom arrow 23 indicates State with family of DTE/DCE signals.

Referring to FIG. 3, reference is made to state diagram oval 37 which is depicted at the upper left corner of FIG. 3. As one can see, oval 37 contains n=7 which is the state number, the state name is DTE release, where DTE stands for Data Terminal Equipment. Beneath the center line of oval 37, one sees the nomenclature (1,OFF) which indicates that the signal on the circuit is a binary 1 and the signal on the C circuit is off. Beneath that, one sees the nomenclature (Flags, Off) which means that the signal on the r circuit contains flags, while the signal on the I circuit is off. Beneath that is the terminology On/Off. This stands for the fact that the signal timing is either on, off, or on/off. Thus, each and every item of oval 30 in the state diagram of FIG. 3 can be interpreted by referring to the legend of. FIG. 2 and thereby understanding the associations of signals.

We will now go through each module shown in FIG. 3 and describe the operation of each module and how the modules are related in regard to the state diagram of FIG. 3. This will enable one to understand how the above-noted protocol is modified in order to achieve the results of the present invention.

Ready State 1 (STATE OVAL MODULE 31)

This state is initially entered by initializing the DTE/DCE equipments. This state is also entered from state 2, 7, 17 or 21 (Ovals 32,37,46 or 38) at the end of a half duplex transmission or when both DTE and DCE are ready to initiate a new transmission.

DTE Data Request State 2 (STATE OVAL MODULE 32)

This state is entered from state 1 (Oval 31) by the DTE asserting the control "C" lead to request service and initiating the transmission of flags. The transmission of flags occurs before, simultaneously with, or no later than 5 milliseconds of assertion of the "C" lead for a data transmission. To prevent unintentional transmission upon assertion of the "C" lead (which may occur upon power-up of the INC), the DCE inhibits commencement of its medium access sequence until both "C" lead assertion and flags are detected from the DTE. The DTE remains in this state for up to 4 seconds, before reverting to state 1 and indicating a radio malfunction to the upper communications processing layers.

DCE Acknowledge State 3 (STATE OVAL MODULE 33)

This state is entered from state 2 (Oval 32) by the DCE gaining medium access. The DCE initiates transmission of flags to indicate that it is ready to accept data from the DTE. The DTE waits a minimum of 24 bit times (3 flag characters) before initiating transmission of data to the DCE. The DCE remains in this state for at least 19.5 ms, waiting for data from the DTE. If data transmission is not initiated by the DTE within this time, the on-air transmission time may be extended by the DCE transmitting the flags being received from the DTE. The DCE transmits up to 1800 bytes of flags, and then display "OVERFLOW", and initiates an abort sequence (transition to state 40).(Oval 40)

DTE Data Transfer State 4 (STATE OVAL MODULE 34)

This state is entered from state 3 (Oval 33) when the DTE begins transmission of date to the DCE. Upon receiving more than 1800 bytes of zero bit inserted data from the DTE, the DCE will display "OVERFLOW" and initiate an abort sequence (transition to state 40). The DCE will not act upon the flag characters that are embedded between information packets for the entire length of the DTE data transfer state.

DTE End Date State 5 (STATE OVAL MODULE 35)

This state is entered from state 4 (Oval 34) when DTE data transfer is complete. This state assures that there will be 2 flag characters appended to the data before notifying the DCE that transmission is complete.

DTE Release State 7 (STATE OVAL MODULE 37)

This state is entered from state 5 (Oval 35) when closing flag characters have been sent to the DCE. This state releases the control lead and waits for the DCE to become idle.

DCE Busy State 21 (STATE OVAL MODULE 38)

This state is entered from state 1 (Oval 31) by the DCE asserting its Indicate lead when the DCE detects incoming radio information (voice or data) or when the DCE is set to any mode or condition that prevents it from accepting DTE data service requests. The DTE waits for flags from the DCE indicating a DCE data request for up to 250 ms, before assuming that the incoming information is voice. This is used by the DTE to adjust network access timing. The DTE recovers from this condition if flags are subsequently received from the DCE and continues to process the received data normally.

This state is entered from state 20 or 40 (Ovals 39 or 40) when the DTE recognizes the DCE voice priority override by dropping the control lead.

This state is entered from state 7 (Oval 37) upon the completion of a normal date transmission if the Indication lead is asserted by the DCE.

DCE No Channel Access State 20 (STATE OVAL MODULE 39)

This state is entered from state 2 or 5 by the DCE asserting its indicate lead when the DCE radio is set to voice priority override has been invoked. This state resets a DTE that has been in the process of sending flags.

DCE Data Abort State 40 (STATE OVAL MODULE 40)

This state is entered from state 3 or 4 by the DCE asserting its indicate lead when the DCE radio is set to voice priority mode and a voice priority override has been invoked, or from state 4 when the DCE has received 1800 bytes of zero bit inserted data from the DTE. This state is used to reset a DTE that has been in the process of sending data.

DCE Data Request State 12 (STATE OVAL MODULE 41)

This state is entered from state 1 or 21 when the DCE radio determines that the incoming information is data information. This state asserts the Indication lead and initiates the sending of flags to the DTE notifying it that it should prepare to receive data.

DTE Acknowledge State 13 (STATE OVAL MODULE 42)

This state is entered from state 12 by the DTE detecting the DCE flag characters. When the DTE is ready to accept data from the DCE, it sends flags to the DCE. The DCE shall wait up to 80 ms for flags from the DTE before losing capture; this condition may result in the received data being corrupted and/or lost.

DCE Data Transfer State 14 (STATE OVAL MODULE 43)

This state is entered from state 13 by the DCE detecting flags. When the DCE detects flags from the DTE it can initiate the transmission of the data to the DTE. Data transmission start to the DTE is a function of internal radio timing and buffering. The DCE radio will buffer an initial quantity of data before transmitting to the DTE to assure that the DTE does not become data starved which could result in packet segmentation by the DTE.

DCE End Frame State 15 (STATE OVAL MODULE 44)

This state is entered from state 14 by the DCE when a complete data frame has been transmitted to the DTE, indicated by the transmission of flags to the DTE. This is a passive state to the DCE radio in that it does not generate the flags that get sent to the DTE. A minimum of two flags are required to be included in between frames within an FMU.

DCE End Data State 16 (STATE OVAL MODULE 45)

This state is entered from state 15 when transmission of closing flags to the DTE has been completed, indicated by the transmission of binary ones by the DCE. This is a passive state to the DCE radio in that the incoming DCE radio does not generate the binary ones sent to the DTE. The binary ones that are sent to the DTE are generated by the outgoing DCE radio as part of it's block error correction coding process for block filling. Note that any number of ones may be received before the I lead is dropped and the DCE Release state is entered (State 17).

This state may also be entered from an abort (indicated by binary ones being received in the date) during the data transfer of state 14. This condition results from the transmitting DCE entering a DCE Data Abort (state 40).

DCE Release State 17 (STATE OVAL MODULE 46)

This state is entered from state 15 or 16 when all DCE received data processing is complete. This state is entered when the DCE releases the indicate lead with transmission of all ones to the DTE. When the DTE detects the release of the indicate lead it initializes the DTE and exits to the ready state 1. This state may also be entered from state 14.

Figure 4:
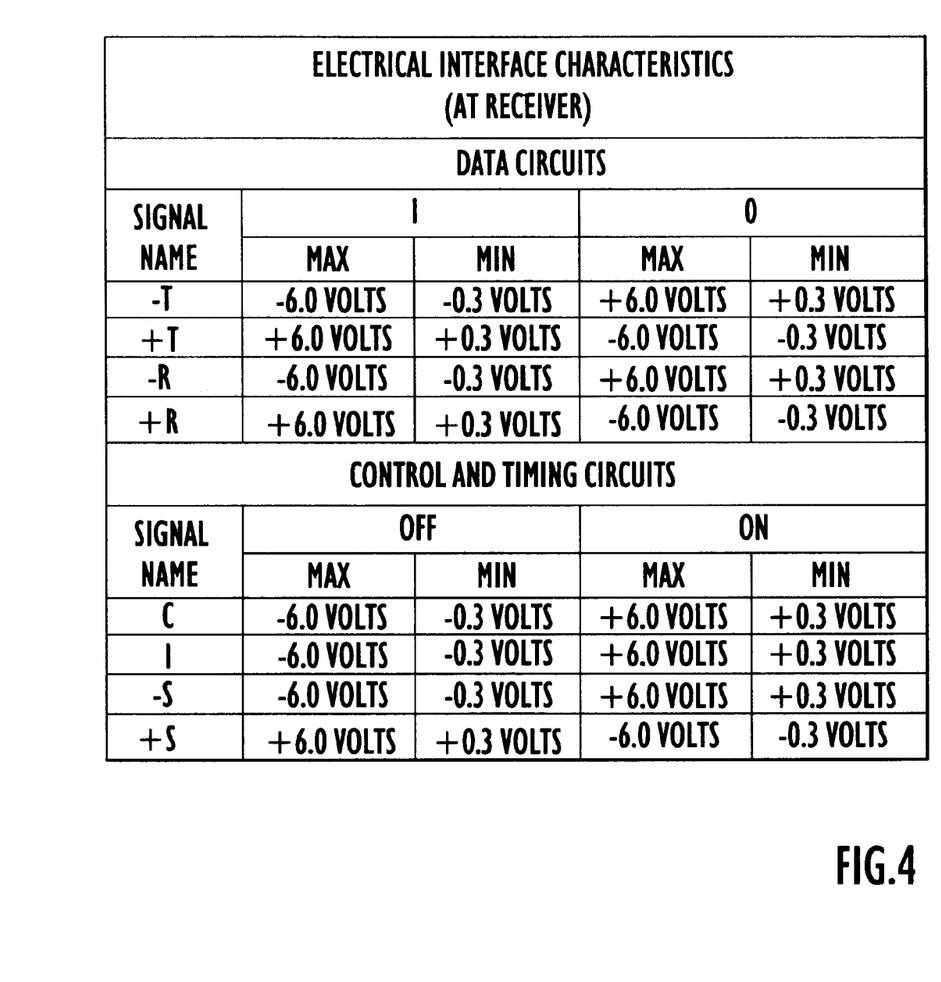
FIG. 4 is a table depicting the voltage interfaces for the various signal leads to be explained.

Referring to FIG. 4 there is shown a table specifying the voltage levels at each of the data circuits as for the T and R leads and the control and timing circuits, including the C and I signal, both maximum and minimum conditions. It is noted that the electrical characteristics of the radio packet mode and the half duplex digital voice interface circuit are identical to CCITT recommendations V.10 for interfaces to voice band modems.

Figure 5:
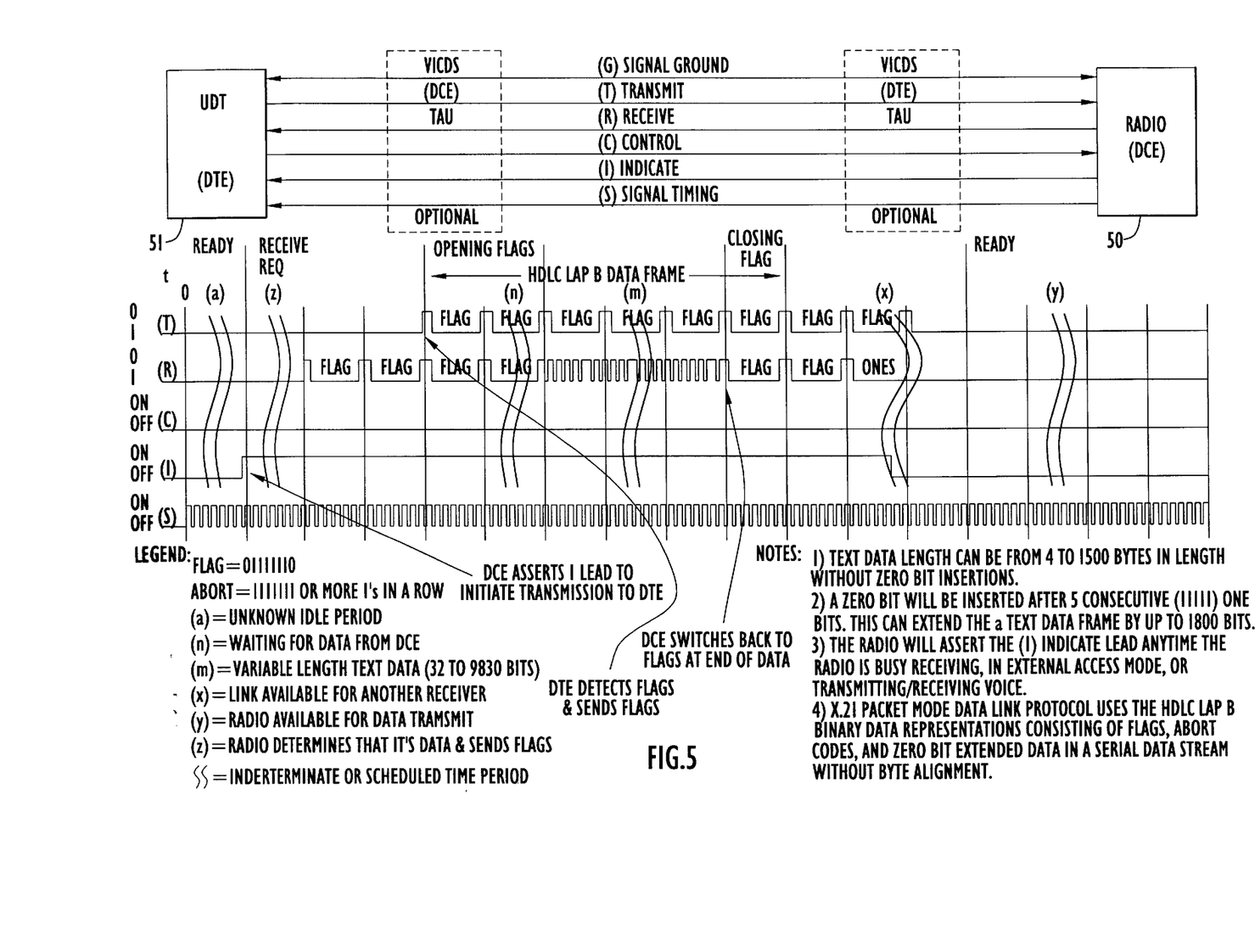
FIG. 5 is a detailed timing diagram depicting received signaling/timing of the radio receiver.

Referring to FIG. 5 there is shown a series of timing diagrams depicting a radio packet mode receiving signal link/timing diagram. The timing is displayed as a six (6) line, including ground interface. As seen in FIG. 5 at the top right-hand corner, there is a half duplex radio device 50 also designated as a DCE for Data Communications Equipment coupled to a DTE or a Data Terminal Equipment 51 via six data lines. As one can see, the coupling is made between the six lines to the DTE 51. The coupling lines are labeled G, T, R, C, I, S, respectively standing for Signal Ground, Transmit, Receive, Control, Indicate, Signal Timing. The timing diagrams indicates the various states on each of the leads T, R, C, I and S in order to implement the receive operation.

Referring to the left-hand side of FIG. 5, one can see that initially the system is in a ready state. Therefore, all leads, T, R, C, I, and S present signals indicate of the off state. During the first request, the DCE which is module 50, places a one on the I or indicate lead which asserts that it wishes to initiate a transmission to the DTE 51.

The next sequence of events that occurs is on the receive lead R where flags are initiated and sent by radio 50. The flag is detected on the T lead and flags are then sent by the DTE. If one follows the transmission sequence, it shows that during the transmission of data flags are acknowledged and sent and data is then received. It is noted that the radio which is module 50 will activate or assert the I indicate lead anytime the radio is busy as receiving data, or transmitting/receiving voice. As one can clearly see, the status on the T, R, C, I and S leads are clearly shown in FIG. 5 in receive communications between a radio module 50 and a data terminal equipment 51. It is noted that the data terminal equipment 51 can also be designated as a UDT, or user data terminal.

Figure 6:
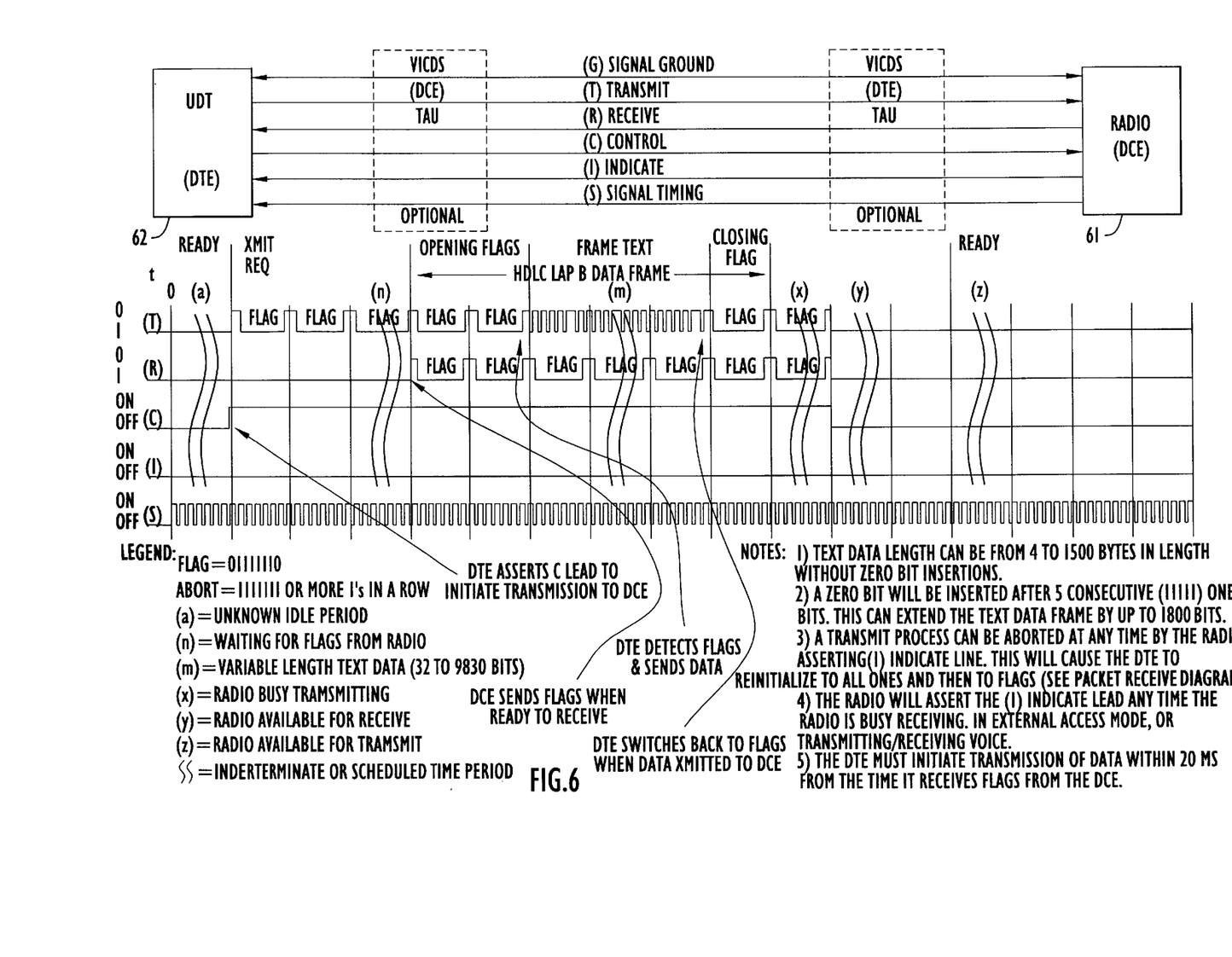
FIG. 6 is a series of timing diagrams depicting the radio packet mode transmit signaling/timing.

Referring to FIG. 6 there is shown a timing diagram of the VHS/HF Radio Packet Mode Transmit Sync Signaling/Timing diagram. The radio 61 is communicating with the UDT or DTE 62. The leads are as indicated in FIG. 5 and the signals are shown. The transmission sequence is again explained by looking at the left-hand side of the figure which indicates a ready condition and proceeding towards the right which shows another ready condition thus completing a cycle. All the appropriate signaling such as the inception of flags and the detection of flags are noted in the diagram. It is again noted that the radio will assert the I indicate lead any time the radio is busy receiving data in an external access mode, or transmitting/receiving voice, this I lead which is shown by the I diagram as off during the transmitting stage is operated as discussed.

Each of the diagrams, as FIG. 5 and FIG. 6, contain Legend Notes which further explain the operation of the system. It is indicated for example that the Notes indicate waiting for data or waiting for flags from radio, and various numerals are depicted in conjunction with each diagram to indicate the status of each of the different modes on each of the different leads.

It is the main aspect of the protocol to control the C and I leads so that half duplex radios can communicate without a problem using the X.21 HDLC protocol.

Figure 7:
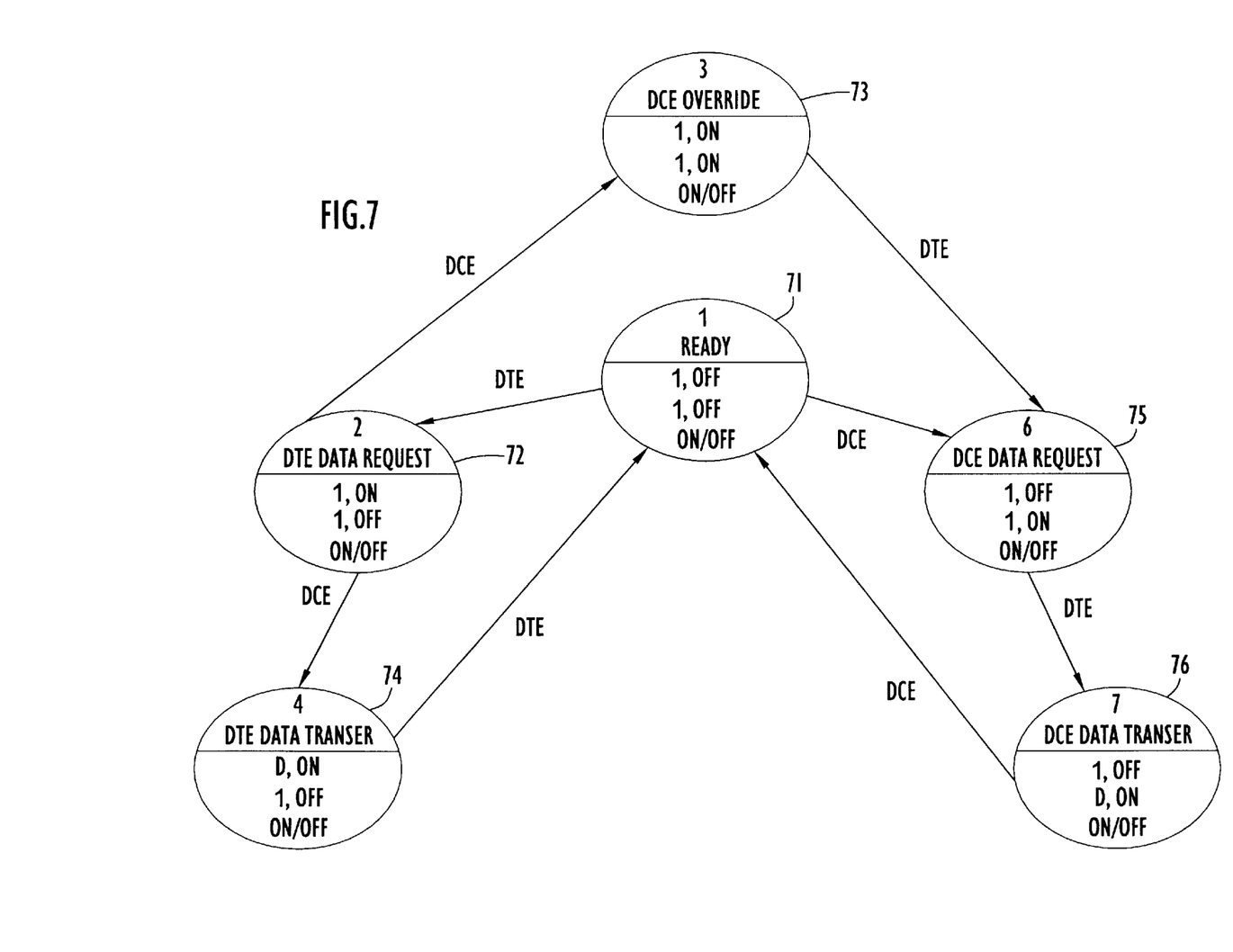
FIG. 7 is a state diagram depicting half duplex voice mode operation.

Referring to FIG. 7 there is shown a state diagram depicting half duplex CVSD Voice Mode Operation. This explains how a half duplex receiver operates in the voice mode. The state diagrams of FIG. 7 are interpreted in accordance with the definitions promulgated in conjunction with FIG. 2, and the state ovals are referred to in FIG. 7 and are interpreted as those states depicted in FIG. 3.

Ready State 1 (STATE OVAL 71)

This state is initially entered from the Data Transfer states by reinitializing the DTE/DCE equipments.

DTE Data Request State 2 (STATE OVAL 72)

This state is entered from state 1 by the DTE asserting the C Lead to indicate that it has data to transmit. In this state, the DTE loads information for transmission into the transmission chip. The DTE remains in this state at least 100 ms, but no longer than 500 ms.

DCE Override State 3 (STATE OVAL 73)

This state is entered from state 2 (Oval 72) by the DCE asserting the I Lead after the DTE has asserted the C Lead. This will, in effect, override the DTE's request for service. The DTE drops the C lead within 20 ms and disables the transmission function in preference of the incoming receive.

DTE Data Transfer State 4 (STATE OVAL 74)

This state is entered from state 2 (Oval 72) by the DCE placing clock on the line to trigger the DTE's transmission chip. It is only when the clock arrives that the data gets triggered onto the transmit line. The DTE drops the C lead to indicate that the data has been completely transferred. The DCE then removes the clock. The DTE and DCE transition to state 1 (Oval 71).

DCE Data Request State 6 (STATE OVAL 75)

This state is entered from state 1 by the DCE asserting the I Lead to indicate incoming data. This state is also entered from state 3 by the DTE dropping the C Lead. The DTE conditions itself to receive data within 50 ms. A fault condition is indicated to the upper layer processes after 500 ms without data. Following this timeout, the DTE transition to state 1.

DCE Data Transfer State 7 (STATE OVAL 76)

This state is entered from state 6 by the DCE activating the clock and putting data on the receive line. The DCE drops the I lead and shuts off the clock to indicate that the data transfer is complete. The DTE and DCE then transitions to state 1.

As one can ascertain, the half duplex digital voice service can operate at various rates. The preferred rate is at 16 kbit/sec (KBPS). The Data Terminal Equipment accepts signal timings from the data communications device such as a VHF radio. The DTE synchronizes to the transmitted DCE signal and provides timing and accepts data at the supplied signaling rate from the DCE device in non-continuous bursts. This type of transmission and synchronization is well-known in the art. The technique of receiving a clock and locking to a received clock is also well-known. The DCE, which is the radio, does provide signal timing to the DTE device to support voice data transfers at the data transfer rate, which as indicated above is 16 kbit/sec. (KBPS) for VHF operation. Data is transferred between the DCE and the DTE in noncontinuous bursts. As indicated above, this technique can be used in VHF transmission or HF transmissions. Depending on the transmission, different data rates are used. For example, the VHF radio provides signal timing to support 16 kbit/sec data transfers between the radio and the DTE. The data is transferred between the radio and the DTE in bursts and these bursts are no greater than 1500 bytes in length. In regard to the HF radio, that can provide the signal timing to support from 75–2400 bits/sec data transfers between the radio and the DTE. The data can be transferred between the radio and the DTE in bursts, which again are no greater than 1500 bytes in length. The above-noted protocol enables as indicated half duplex radios to transmit and receive voice by using the I and C signals of the conventional X.21 protocol as busy and push-to-talk signals. The protocol remains the same for data transmission and for data, the T and R data signal interface, uses CCITT V.11 balance transmitters and receivers. The C and I control signal interface uses CCITT V.10 unbalanced transmitters and receivers and the signal timing signal interface uses the CCITT V.11 balanced transmitters and receivers. The state signal and timing, as indicated, conforms to 1984 CCIT red book recommendation X.21 for lease circuit service-point-to-point and packet switch service.

Figure 8:
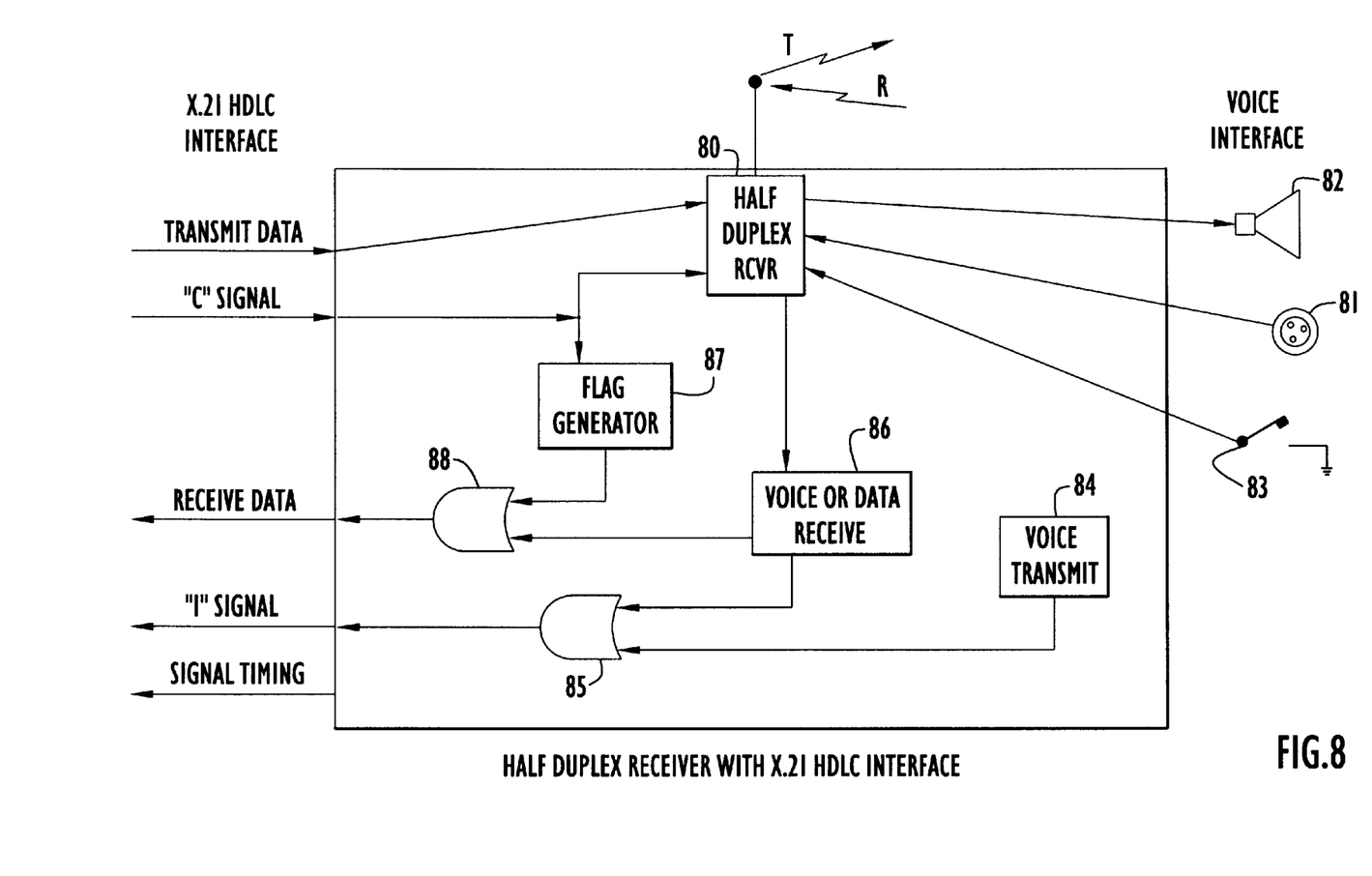
FIG. 8 is a simple block diagram of a half duplex receiver in accordance with this invention.

Referring to FIG. 8 there is a simple block diagram of a half duplex receiver 80 operating with the X.21 HDLC protocol and having a Push-to-talk switch 83 and a microphone 81 to enable the receiver to transmit voice and also having a speaker 82 to enable the user to receive voice. As explained the half duplex receiver operates with the above noted protocol and is capable of transmitting and receiving data as is conventional with that protocol. In order to implement a voice mode the receiver has a switch or push-button to enable one to activate the microphone 81 and the voice transmit function. Upon enabling the push button or Push-to-talk button the half duplex receiver initiates voice transmission. As indicated, the receiver also operates to control the "I" signal under the following conditions. As seen in the figure, if voice transmission is detected via module 84 the "I" signal is activated via OR gate 85. As above indicated, the "I" signal is also activated when voice or data is being received from module 86. It is noted that the OR function which is implemented by gate 85 indicates activation of the "I" signal when the receiver is transmitting voice or receiving voice or data. The voice or data receive information is presented to the X.21 HDLC receive data lead via OR gate 88. Receive voice information that is presented to the X.21 HDLC interface is discarded by the X.21 HDLC above noted protocol. Consistent with the above noted protocol the "C" signal activates the flag generator module 88 thereby providing flags to receive data X.21 HDLC interface via OR gate 88. The flags indicate that the half duplex receiver is ready to accept data for transmission.

It should be apparent from the above, the half duplex voice service is a modified protocol. One employs the CCITT X.21 six wire interface definition and the CCITT V.10 unbalanced circuit. This protocol is utilized between a DCE VHF radio. The protocol is implemented as event-driven state process for VHF/HF radio packet mode state and signal/timing diagrams as for example, shown in FIGS. 3,4 and 5.

VHF/HF RADIO PACKET MODE PROTOCOL

The VHF/HF packet mode protocol is a half duplex implementation of the industry standard HDLC LAPB protocol that has been modified specifically to interface with radios.

It uses the CCITT X.21 point-to-point service six (6) wire interface definition and the CCITT V.10 unbalanced circuit definition.

The protocol is implemented as event driven state processes (See FIGS. 3, 4, 5 and 6 for VHF/HF Radio Packet Mode State and Signal/Timing Diagram).

The half duplex HDLC LAPB protocol is fully implemented in the DTE Serial Communication Controller (SCC), an integrated circuit specifically designed for serial communication applications.

The half duplex HDLC LAPB protocol is partially implemented in the DCB HF and VHF radio as follows:

1. Half duplex control ("C") and Indicate ("I") signals are supported by the radio.
2. Flag and abort detection and generation is provided in the radio to bound transmitted/received data frames which contain multiple HDLC LAPB information packets.
3. Zero bit insertion/deletion and CRC generation and validation is not performed by the radio. Transmitted and received frames are encapsulated by the radio waveform generation process and passed between radios to their directly connected DTE which performs the zero bit insertion/deletion and CRC generation/validation.
4. HDLC LAPB information packets of a transmit/receive DCB radio frame must contain 1 opening flag, zero inserted text, 16 or 32 bit CRC, and 1 closing flag (multiple HDLC LAPB frames can be contained within a single radio transmission).
5. A minimum of three opening flags are required at the start of a DTE transmission before zero bit inserted text starts. This is required to allow time for the DTE to transition to the data transfer state.
6. A minimum of two closing flags are required at the end of the DTE data transfer to assure that the DTE at the other end of the link receives a complete HDLC LAPB packet.
7. Flags that are embedded between HDLC LAPB packets in a DTE transmitted frame are ignored by the radio and passed from initiating DTE to terminating DTE without change.

What is claimed is:

1. In a communication system including a half duplex radio communicating voice and digital data with other half duplex radios and linked to a data terminal operating under a data-only, point-to-point, fall duplex protocol, a method for enabling communication between the data terminal and the radios by modifying the use of signals within the protocol, the method comprising the steps of:
   (a) employing a first control signal within the protocol to indicate transmission of data from the data terminal to the half duplex radio;
   (b) employing a second control signal within the protocol to indicate to the data terminal that the half duplex radio is busy transmitting or receiving voice data or receiving digital data from another radio, wherein assertion of the second control signal prevents the half duplex radio from receiving digital data from the data terminal; and (c) transmitting from the half duplex radio to the other radios interlaced voice and digital data, including digital data received from the data terminal.

2. The method of claim 1, further comprising the steps of:

(d) receiving at the half duplex radio interlaced voice and digital data from the other radios; and (e) transmitting digital data received in step (d) from the half duplex radio to the data terminal while asserting the second control signal.

3. The method of claim 1, further comprising the step of:

(d) terminating transmission of data from the data terminal to the half duplex radio when the second control signal is asserted.

4. The method of claim 1, wherein the data terminal and the half duplex radio are connected by a plurality of data lines, including first and second control lines and first and second data lines, wherein:

step (a) includes the data terminal asserting the first control signal on the first control line while data is being transmitted from the data terminal to the half duplex radio on the first data line; and step (b) includes the half duplex radio asserting the second control signal on the second control line while data is being transmitted from the half duplex radio to the data terminal on the second data line.

5. The method of claim 1, wherein the protocol is the X.21 Higher Data Level communication (HDLC) protocol, the first control signal is a Control signal (C) transmitted from the data terminal to the half duplex radio, and the second control signal is an Indicate signal (I) transmitted from the half duplex radio to the data terminal.

6. A communication interface between a plurality of half duplex radios communicating both voice and digital data and a data terminal of a full duplex digital communication system operating under a data-only, point-to-point, full duplex protocol, comprising:

a half duplex radio comprising a half duplex transmitter and receiver adapted to transmit and receive interlaced voice and digital data to and from other half duplex radios;

said half duplex radio transmitting and receiving digital data to and from the data terminal using a modification of the full duplex protocol such that said half duplex radio asserts a control signal within the protocol to indicate to the data terminal that said half duplex radio is busy transmitting or receiving voice data or receiving digital data from another radio, wherein assertion of the control signal prevents the half duplex radio from receiving digital data from the data terminal, thereby effecting half duplex communication with the data terminal; and wherein said half duplex radio transmits to the other half duplex radios voice data interlaced with digital data received from the data terminal and transmits digital data received from the other half duplex radios to the data terminal.

7. The interface of claim 6, wherein the data terminal terminates transmission of data to the half duplex radio when said control signal is asserted.

8. The interface of claim 6, wherein said half duplex radio is coupled to the data terminal via a plurality of data lines corresponding to signals provided in the fall duplex protocol.

9. The interface of claim 8, wherein said plurality of data lines includes first and second control lines and first and second data lines, wherein said half duplex radio asserts the control signal on the second control line while data is being transmitted from said half duplex radio to the data terminal on the second data line, and the data terminal asserts another control signal on the first control line while data is being transmitted from the data terminal to said half duplex radio on the first data line.

10. The interface of claim 6, wherein the full duplex protocol is the X.21 Higher Data Level Communication (HDLC) protocol, and said control signal is an Indicate signal (I) transmitted from said half duplex radio to the data terminal.

11. The interface of claim 10, wherein said half duplex radio is coupled to the data terminal via a plurality of data lines corresponding to signals provided in the X.21 HDLC protocol, including: a transmit (T) line over which the data terminal transmits data to said half duplex radio; a control (C) line over which the data terminal transmits asserts a transmit control signal while transmitting data over the transmit line; a receive (R) line over which said half duplex radio transmit data to the data terminal; and an Indicate (I) line over which said half duplex radio transmits said control signal to the data terminal.

* * * * *